(12) United States Patent
Chen et al.

(10) Patent No.: US 11,125,971 B2
(45) Date of Patent: Sep. 21, 2021

(54) VEHICLE LENS, CAMERA MODULE AND VEHICLE CAMERA

(71) Applicant: JIANGXI LIANCHUANG ELECTRONIC CO., LTD., Nanchang (CN)

(72) Inventors: Weijian Chen, Nanchang (CN); Xuming Liu, Nanchang (CN); Jiyong Zeng, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 0 days.

(21) Appl. No.: 16/858,586

(22) Filed: Apr. 25, 2020

(65) Prior Publication Data

US 2020/0257078 A1    Aug. 13, 2020

Related U.S. Application Data

(63) Continuation of application No. PCT/CN2019/106771, filed on Sep. 19, 2019.

(30) Foreign Application Priority Data

Dec. 5, 2018 (CN) .......................... 201811481325.0

(51) Int. Cl.
*G02B 9/12* (2006.01)
*G02B 13/18* (2006.01)
(Continued)

(52) U.S. Cl.
CPC .............. *G02B 9/12* (2013.01); *G02B 13/18* (2013.01); *H04N 5/2254* (2013.01); *H04N 5/2253* (2013.01); *H04N 5/23229* (2013.01)

(58) Field of Classification Search
CPC ...... G02B 9/12; G02B 13/18; G02B 13/0045; H04N 5/2254; H04N 5/2253; H04N 5/23229
See application file for complete search history.

(56) References Cited

U.S. PATENT DOCUMENTS 10,641,993 B1 * 5/2020 Ning .................... G02B 9/62
2015/0362708 A1 * 12/2015 Lee ..................... G02B 13/16
359/708
(Continued)

FOREIGN PATENT DOCUMENTS

CN 202886721 U 4/2013
CN 103439785 A 12/2013
(Continued)

OTHER PUBLICATIONS

First office action issued in corresponding Chinese application No. 201811481325.0 dated Oct. 30, 2019(25 pages).
(Continued)

*Primary Examiner* — Nasim N Nirjhar

(57) ABSTRACT

The embodiments of the disclosure provide a vehicle lens, an imaging device, a camera module and a vehicle camera. From an object side to an image side, the vehicle lens sequentially includes a first group with a negative refractive power, a stop, a second group with a positive refractive power, and a third group with a positive refractive power. The first group includes a first lens and a second lens. The second group includes at least a third lens. The third group includes a fourth lens, a fifth lens, and a sixth lens, wherein the fourth lens has a positive refractive power, an convex object side surface and an convex image side surface, the fifth lens has a negative refractive power and a concave object side surface, the sixth lens has a positive refractive power. The third group includes at least one aspheric lens.

19 Claims, 14 Drawing Sheets

(51) Int. Cl.
*H04N 5/225* (2006.01)
*H04N 5/232* (2006.01)

(56) References Cited

U.S. PATENT DOCUMENTS

| | | | | |
|---|---|---|---|---|
| 2017/0343772 | A1* | 11/2017 | Sun | G02B 9/60 |
| 2018/0321467 | A1† | 11/2018 | Wu | |
| 2019/0064483 | A1* | 2/2019 | Chen | G02B 9/62 |
| 2019/0331900 | A1* | 10/2019 | Yao | G02B 13/02 |
| 2020/0200998 | A1* | 6/2020 | Wei | G02B 13/006 |
| 2020/0363609 | A1* | 11/2020 | Bao | G02B 9/64 |

FOREIGN PATENT DOCUMENTS

| | | |
|---|---|---|
| CN | 103676092 A | 3/2014 |
| CN | 203606551 U | 5/2014 |
| CN | 105044885 A | 11/2015 |
| CN | 106842500 A | 6/2017 |
| CN | 108445611 A | 8/2018 |
| CN | 108469667 A | 8/2018 |
| CN | 108490584 A | 9/2018 |
| CN | 108681050 A | 10/2018 |
| CN | 109445068 A | 3/2019 |
| WO | 2014175038 A1 | 10/2014 |
| WO | 2018066641 A1 | 4/2018 |

OTHER PUBLICATIONS

International Search Report issued in corresponding International application No. PCT/CN2019/106771, dated Dec. 23, 2019(8 pages).
Written opinion of International Search Authority issued in corresponding International application No. PCT/CN2019/106771, dated Dec. 23, 2019(6 pages).

* cited by examiner
† cited by third party

VEHICLE LENS, CAMERA MODULE AND VEHICLE CAMERA

CROSS REFERENCE TO RELATED APPLICATIONS

This application is a continuation of a PCT Application Serial No. PCT/CN2019/10677 filed on Sep. 19, 2019, which entitled "VEHICLE LENS AND IMAGING DEVICE". The PCT application claims priority to a Chinese application No. 2018114813250, filed on Dec. 5, 2018, titled "VEHICLE LENS AND IMAGING DEVICE". The entirety of the above-mentioned applications is hereby incorporated by reference herein.

TECHNICAL FIELD

The disclosure relates to the field of optical camera lens technologies, and more particularly, to a vehicle lens, an imaging device, a camera module and a vehicle camera.

BACKGROUND

With the increasing use of Advanced Driving Assistant System (ADAS) in cars, the use of vehicle cameras is becoming more and more widespread, and the demand of vehicle cameras is increasing in driving. An optical lens is an important component in the vehicle camera.

The applications of the vehicle camera in the driving assistant system mainly realize a perception of road conditions around a vehicle, and realize functions of forward collision warning, lane departure warning, pedestrian detection, and so on, by collecting images using the optical lens and then processing the images and converting them into digital signals using a photosensitive component circuit and a control component in the camera. When the vehicle camera is installed in different positions of the car, the vehicle camera implements different functions, and there are various special requirements for the optical lens.

With the development of electronic technology, vehicle-mounted image sensors are developing towards high pixels. Present conventional vehicle-mounted lenses have low resolution, which cannot meet the market demand.

SUMMARY

An object of the disclosure is to provide a vehicle lens, an imaging device, a camera module and a vehicle camera to solve the above problems.

The embodiments of the disclosure achieve the foregoing object through the following technical solutions.

In a first aspect, the disclosure provides a vehicle lens, from an object side to an image side thereof, the vehicle lens sequentially includes: a first group with a negative refractive power, a stop, a second group with a positive refractive power, and a third group with a positive refractive power. The first group includes a first lens and a second lens from the object side to the image side, the first group includes at least one aspheric lens. The second group includes at least a third lens, and the second group includes at least one aspheric lens. The third group includes a fourth lens, a fifth lens, and a sixth lens, from the object side to the image side, wherein the fourth lens has a positive refractive power, an convex object side surface and an convex image side surface, the fifth lens has a negative refractive power and a concave object side surface, the sixth lens has a positive refractive power. The third group includes at least one aspheric lens.

In a second aspect, the disclosure provides an imaging device, including the above vehicle lens and an imaging component. The imaging component is configured to convert an optical image formed by the vehicle lens into electrical signals.

In a third aspect, the disclosure provides a camera module, which includes the vehicle lens as mentioned above, a barrel, a holder and an image sensor. The vehicle lens is received in the barrel, and the barrel is engaged with the holder. The image sensor is substantially accommodated in the holder and opposite to the vehicle lens. The image sensor is configured for converting light signals into electrical signals, thereby the images formed by the vehicle lens can be converted and transmitted to a processor.

In a fourth aspect, the disclosure provides a vehicle camera, which includes the camera module as mentioned above, a processor, and a memory, wherein the camera module is configured to capture images, the processor is configured to process the captured images, and the memory is configured to store the captured images.

Compared with the prior art, the vehicle lens and the imaging device provided by the disclosure have the characteristics of high resolution and good imaging effect. The first group of the vehicle lens is mainly used for light collection. The aspheric lenses are mainly configured to provide a large focal length for the vehicle lens, so that the lens can have better recognition in small field of view. The second group is mainly configured for correcting the spherical aberration of an optical system of the vehicle lens, to improve the resolution of the vehicle lens. The third group is configured to eliminate the chromatic aberration. The aspheric lenses are used mainly for correcting the astigmatism of the optical system of the vehicle lens, and improving the resolution of the vehicle lens.

A part of the advantages of the disclosure will be given in the following description, and a part of the advantages will become apparent from the following description or will be understood through the practice of the present invention.

BRIEF DESCRIPTION OF THE DRAWINGS

The above and/or additional aspects and advantages of the disclosure will become apparent and easily understood from the description of the embodiments in conjunction with the following drawings, in which.

REFERENCE NUMERALS OF MAIN COMPONENTS

Figure 1:
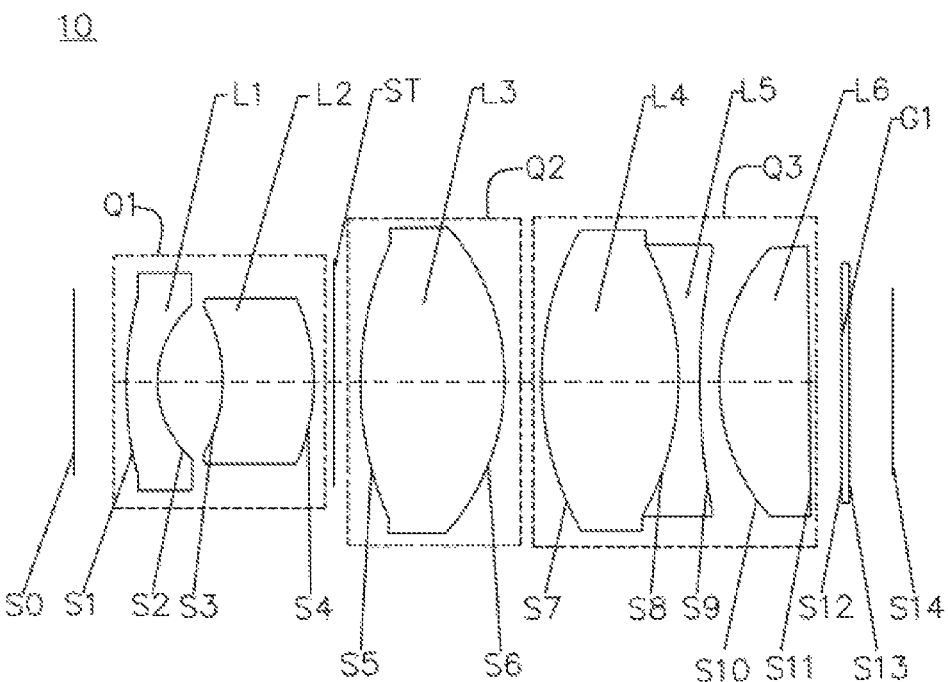
FIG. 1 is a schematic structural diagram of a vehicle lens according to a first embodiment of the disclosure.

| first group | Q1 | first lens | L1 |
|---|---|---|---|
| second lens | L2 | second group | Q2 |
| third lens | L3 | seventh lens | L7 |
| third group | Q3 | fourth lens | L4 |
| fifth lens | L5 | sixth lens | L6 |
| stop | ST | filter | G1 |

DETAILED DESCRIPTION OF PREFERRED EMBODIMENTS

In order to make the objects, features, and advantages of the disclosure more comprehensible, specific embodiments of the disclosure will be described in detail below with reference to the accompanying drawings. The drawings show several embodiments of the disclosure. However, the disclosure can be implemented in many different ways and is not limited to the embodiments described herein. Instead, the purpose of these embodiments is to make the disclosure more thorough and comprehensive.

An object of the disclosure is to provide a vehicle lens. By using several aspheric lenses, the resolution of the lens can be improved, which can match a chip of 8 mega pixel specifications, and meet the market's urgent need for high pixel lenses.

An object of the disclosure is to provide a vehicle lens, which has a large field of view (FOV), can collect more information around the car, and reduces safety risks caused by the blind sight zone.

An object of the disclosure is to provide a vehicle lens, in which a first lens of a first group is an aspherical lens. Compared with a spherical lens, the focal length of the aspherical lens can be increased when matching with a chip of the same size, and thereby improving the imaging effect of a central area of an imaging surface.

An object of the disclosure is to provide a vehicle lens, which has a large aperture characteristic, can increase the light flux of the lens, has a good imaging effect when the light is insufficient, and reduces safety risks of driving in a dim environment.

An object of the disclosure is to provide a vehicle lens, each lens of which is made of a glass material with high reliability, the vehicle lens can meet harsh working environment in the vehicle field.

In order to achieve at least one of the above objectives, the technical solution of the disclosure is as follows.

The disclosure provides a vehicle lens and an imaging device, from an object side to an image side thereof, the vehicle lens sequentially includes: a first group with a negative refractive power, a stop, a second group with a positive refractive power, and a third group with a positive refractive power. The first group includes a first lens and a second lens from the object side to the image side, the first group includes at least one aspheric lens. The second group includes at least a third lens, and the second group includes at least one aspheric lens. The third group includes a fourth lens, a fifth lens, and a sixth lens, from the object side to the image side, wherein the fourth lens has a positive refractive power, an convex object side surface and an convex image side surface, the fifth lens has a negative refractive power and a concave object side surface, the sixth lens has a positive refractive power. The third group includes at least one aspheric lens.

In one embodiment, the first lens has a negative refractive power, an object side surface of the first lens is a convex surface and an image side surface of the first leans is a concave surface. The first lens is an aspheric lens. An object side surface of the second lens is a concave surface.

In one embodiment, the third lens has a positive refractive power, an object side surface and an image side surface of the third lens both are convex surfaces. The third lens is an aspheric lens.

In one embodiment, the second group further includes a seventh lens, which is positioned between the third lens and the third group. The seventh lens has a positive refractive power, an object side surface and an image side surface of the seventh lens both are convex surfaces.

In one embodiment, the fourth lens and the fifth lens are cemented to form a cemented doublet. An object side surface of the sixth lens is a convex surface, and the sixth lens is an aspheric lens.

In one embodiment, the vehicle lens of the disclosure satisfies the following expressions:

$$2<D_2/D_1<3; \quad (1)$$

$$110°<FOV<140°; \quad (2)$$

where $D_1$ represents the optical aperture of the first lens corresponding to the central field of view of the vehicle lens, $D_2$ represents the optical aperture of the first lens corresponding to the maximum field of view of the vehicle lens, FOV represents the maximum field of view of the vehicle lens. Satisfying the expressions (1) and (2) can make a front port diameter of the vehicle lens is relatively small, and thus reduces a size of an imaging system of the vehicle lens.

In one embodiment, the vehicle lens of the disclosure satisfies the following expressions:

$$-3<f_{Q1}/f<0; \quad (3)$$

$$1<f_{Q2}/f<4; \quad (4)$$

where $f_{Q1}$ represents the combined focal length of the first group, $f_{Q2}$ represents the combined focal length of the second group, and f represents the system focal length of the vehicle lens. Satisfying the expression (3) can make the combined focal length of the first group is a negative value, which is more conducive to realize the characteristics of large FOV; the combined focal length of the second group satisfies the expression (4), which can converge the light better.

In one embodiment, the vehicle lens of the disclosure satisfies the following expressions:

$$-0.35<(IH_\theta-f*\theta)/(f*\theta)<-0.2; \quad (5)$$

$$0.93<\theta<1.18; \quad (6)$$

where $\theta$ represents the half of the maximum FOV of the vehicle lens, the unit of $\theta$ is radian, $IH_\theta$ represents the actual image height corresponding to the half of the maximum FOV of the vehicle lens $\theta$, vehicle lens, and f represents the system focal length of the vehicle lens. Satisfying the expressions (5) and (6) can increase the focal length of the vehicle lens and improve the imaging effect of a central area of an imaging surface of the vehicle lens, under conditions that the FOV of the lens and the size of the imaging surface are unchanged.

In one embodiment, the vehicle lens of the disclosure satisfies the following expressions:

$$1<R_{11}/f<3; \quad (7)$$

$$-4<R_{21}/f<-0.8; \quad (8)$$

$$0.05<T_{11}/f<0.25; \quad (9)$$

where $R_{11}$ represents a radius of curvature of a center of an object side surface of the first lens, $R_{21}$ represents a radius of curvature of a center of an object side surface of the second lens, $T_{11}$ represents a vector height of the vertex of an object side surface of the first lens, and f represents the system focal length of the vehicle lens. Satisfying the expressions (7), (8) and (9), a rear focal length of the vehicle lens can be effectively shortened to reduce a total optical length of the vehicle lens.

In one embodiment, the vehicle lens of the disclosure satisfies the following expressions:

$$0.8<T_{Q2}/f<3; \quad (10)$$

$$-7\times10^{-6}/°C.<(dn/dt)_{Q2}<0; \quad (11)$$

where $T_{Q2}$ represents the sum of a center thickness of every lens of the second group, f represents the system focal length of the vehicle lens, and $(dn/dt)_{Q2}$ represents the sum of a temperature coefficient of refractive index of every lens of the second group. Satisfying the expressions (10) and (11) is not only conducive to improve the resolution of the vehicle lens, but also makes the vehicle lens has excellent imaging quality in different temperature environments.

In one embodiment, the vehicle lens of the disclosure satisfies the following expression:

$$1.2<TTL/f/IH_\theta<1.8; \quad (12)$$

where TTL represents the system optical total length, and f represents the system focal length of the vehicle lens, $\theta$ represents the half of the maximum FOV of the vehicle lens, and $IH_\theta$ represents the actual image height corresponding to the half of the maximum FOV of the vehicle lens $\theta$, By meeting the expression (12), a relatively compact vehicle lens can be obtained.

In one embodiment, every lens in the vehicle lens provided by the disclosure adopts glass lens. The use of glass lenses can effectively slow down the aging of the vehicle lens. The vehicle lens has good temperature control, can adapt to different temperature occasions, and has a long service life and a high stability.

In one embodiment, the F number of the vehicle lens provided by the disclosure is less than or equal to 1.5.

In one embodiment, the disclosure further provides an imaging device, the imaging device includes any one of the above vehicle lenses and an imaging component. The imaging component is configured to convert an optical image formed by the vehicle lens into electrical signals.

In one embodiment, surface shapes of respective aspherical lenses satisfy the following expression:

$$z = \frac{ch^2}{1+\sqrt{1-(1+K)c^2h^2}} + Bh^4 + Ch^6 + Dh^8 + Eh^{10} + Fh^{12};$$

where z represents a vector height between a point on a curved surface and a vertex of the curved surface along an optical axis; h represents a distance between the point on the curved surface and the optical axis, c represents a curvature of the vertex of the curved surface, K represents a quadratic surface coefficient, B represents a fourth order surface coefficient, C represents a sixth order surface coefficient, D represents an eighth order surface coefficient, E represents a tenth order surface coefficient, and F represents a twelfth order surface coefficient.

The above vehicle lens uses a combination of glass spherical surfaces and glass aspherical surfaces to better correct various aberrations of an imaging system. Compared with the conventional vehicle lens, it has the characteristics of high resolution and good imaging effects, and collects a larger range of surrounding information for a car driving assistant system. The high resolution and the large aperture of the vehicle lens also allow any software to better identify and judge various types of information, thereby ultimately improving the safety of driving.

Specific embodiments of the vehicle lens provided by the disclosure are described as follows with reference to the drawings and tables. In the following respective embodiments, the thickness of every lens in the vehicle lens maybe different and the radius of curvature of every lens in the vehicle lens maybe different, the differences can be referred to parameter tables of respective embodiments.

Embodiment 1

Please refer to FIG. 1, an embodiment provides a vehicle lens 10, from an object side S0 to an image side S14 thereof, the vehicle lens 10 sequentially includes: a first group Q1 with a negative refractive power, a stop ST, a second group Q2 with a positive refractive power, and a third group Q3 with a positive refractive power.

The first group Q1 includes a first lens L1 and a second lens L2 from the object side S0 to the image side S14. The first lens L1 has a negative refractive power, an object side surface S1 of the first lens L1 is a convex surface meanwhile an image side surface S2 of the first lens L1 is a concave surface, the first lens L1 is a glass aspherical lens. The second lens L2 is a lens approximately concentric and with a positive refractive power. An object side surface S3 of the second lens L2 is a concave surface and an image side surface S4 of the second lens L2 is a convex surface. The second lens L2 is a glass spherical lens.

The second group Q2 includes a third lens L3 with a positive refractive power, an object side surface S5 and an image side surface S6 of the third lens L3 are both convex surfaces, and the third lens L3 is a glass aspheric lens.

The third group Q3 includes a fourth lens L4, a fifth lens L5, and a sixth lens L6 in an order from the object side S0 to the image side S14. The fourth lens L4 has a positive refractive power, and an object side surface S7 and an image side surface S8 of the fourth lens L4 are both convex surfaces. The fourth lens IA is a glass spherical lens. The fifth lens L5 has a negative refractive power, an object side surface S8 and an image side surface S9 of the fifth lens L5 are both concave surfaces. The fifth lens L5 is a glass spherical lens. The sixth lens L6 has a positive refractive power, an object side surface S10 of the sixth lens L6 is convex and an image side surface S11 of the sixth lens L6 is concave. The sixth lens L6 is a glass aspheric lens. The fourth lens L4 and the fifth lens L5 are cemented as a cemented body, and S8 is a cemented surface.

A filter G1 is disposed between the third group Q3 and an imaging surface S14, an object side surface of the filter G1 is S12 and an image side surface of the filter G1 is S13.

Relevant parameters of every lens in the vehicle lens 10 provided by this embodiment are shown in Table 1:

TABLE 1

| Surface No. | Sign | Surface type | Radius of curvature | Thickness | Refractive index | Abbe number |
|---|---|---|---|---|---|---|
| Object surface S0 | S0 | Plane | Infinity | Infinity | — | — |
| S1 | L1 | Aspheric surface | 8.363 | 1.219 | 1.81 | 40.7 |
| S2 | | Aspheric surface | 3.299 | 2.825 | — | — |
| S3 | L2 | Spherical surface | −7.174 | 3.975 | 1.91 | 35.3 |
| S4 | | Spherical surface | −8.533 | −0.239 | — | — |
| ST | ST | Spherical surface | Infinity | 2.540 | — | — |
| S5 | L3 | Aspheric surface | 13.069 | 6.192 | 1.50 | 81.6 |
| S6 | | Aspheric surface | −9.982 | 1.870 | — | — |
| S7 | L4 | Spherical surface | 13.088 | 5.9 | 1.59 | 61.2 |
| S8 | L5 | Spherical surface | −13.088 | 0.892 | 1.92 | 18.9 |
| S9 | | Spherical surface | 24.319 | 0.194 | — | — |
| S10 | L6 | Aspheric surface | 7.510 | 3.807 | 1.59 | 61.3 |
| S11 | | Aspheric surface | 54.182 | 0.523 | — | — |
| S12 | G1 | Plane | Infinity | 0.5 | 1.52 | 64.2 |
| S13 | | Plane | Infinity | 2.53 | — | — |
| Imaging surface S14 | S14 | Plane | Infinity | | — | — |

In addition, the parameters of every aspheric lens in this embodiment are shown in Table 2:

TABLE 2

| Surface No. | K | B | C | D | E | F |
|---|---|---|---|---|---|---|
| S1 | −5.65 | −0.00333 | 0.000162 | −3.9E−06 | 2.6E−08 | 4.37E−10 |
| S2 | −3.91 | 0.005303 | −0.00072 | 9.22E−05 | −5.74E−06 | 1.61E−07 |
| S5 | −9.91 | 0.000282 | −6.73E−06 | 9.25E−08 | −1.45E−10 | −1.15E−11 |
| S6 | −6.30 | −0.0009 | 2.09E−05 | −4.75E−07 | 7.57E−09 | −5.57E−11 |
| S10 | −2.95 | 0.000233 | 1.61E−06 | 1.11E−08 | −2.66E−09 | 1.04E−10 |
| S11 | 23.02 | −0.00058 | 1.67E−05 | −2.51E−07 | 6.15E−10 | 1.35E−10 |

Figure 2:
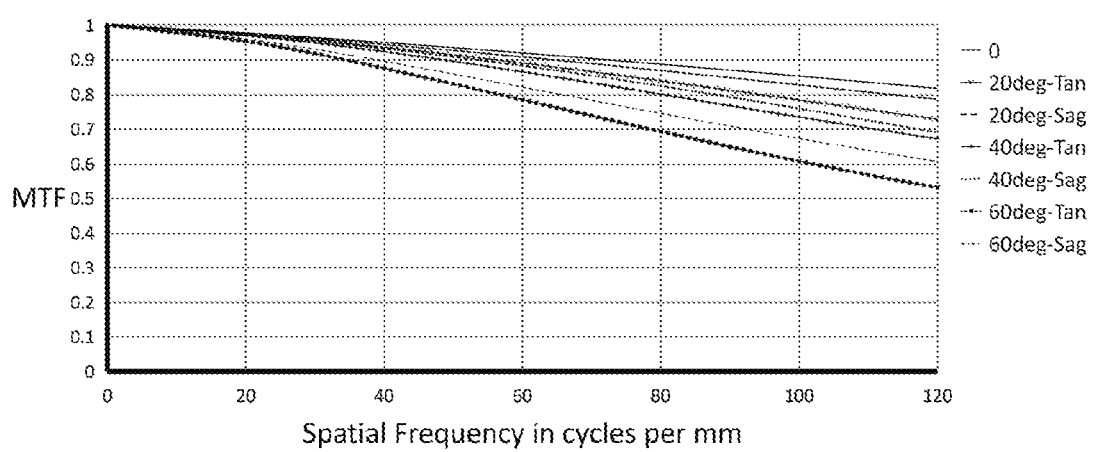
FIG. 2 is a diagram showing modulation transfer function (MTF) curves of the vehicle lens according to the first embodiment of the disclosure.
Figure 3:
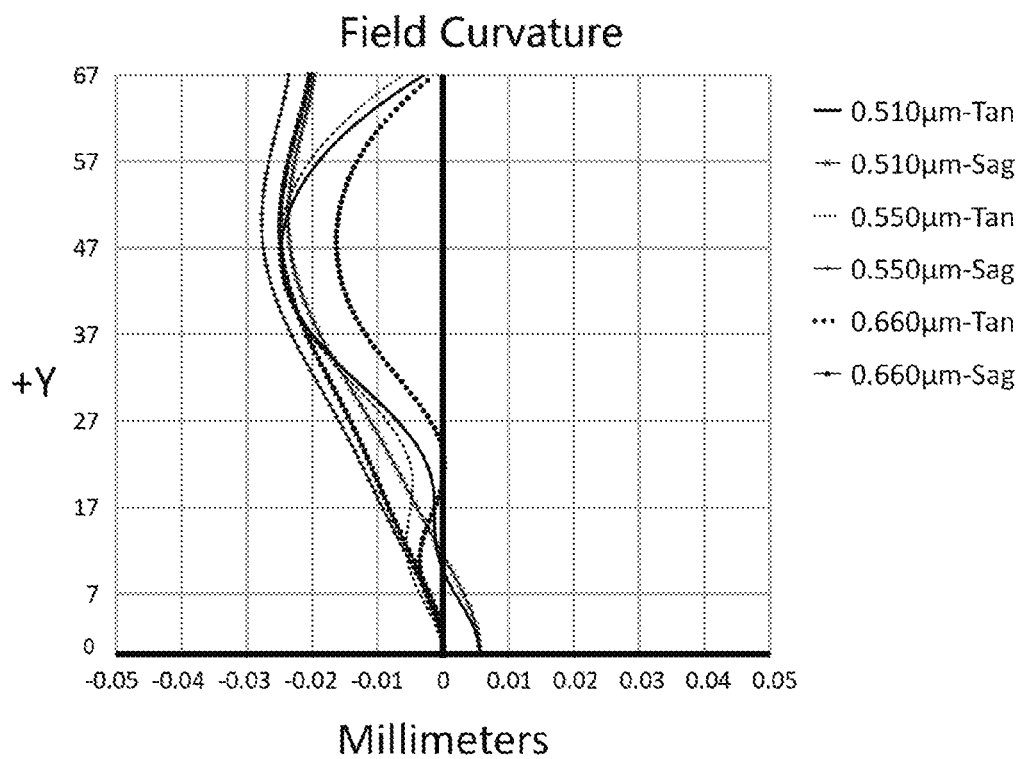
FIG. 3 is a diagram showing field curvature curves of the vehicle lens according to the first embodiment of the present disclosure.
Figure 4:
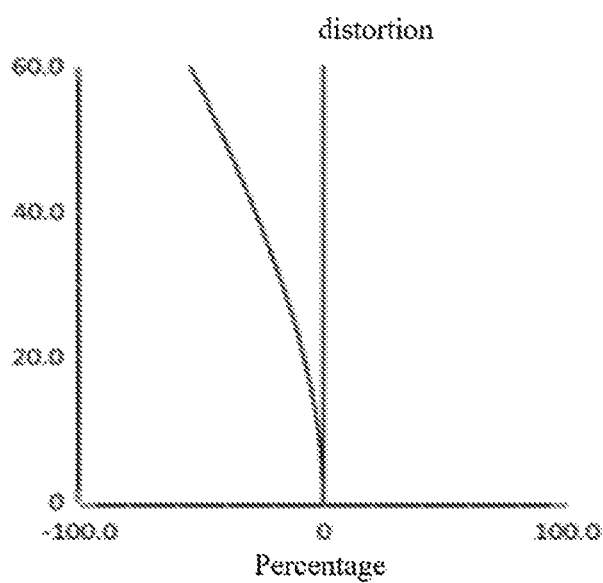
FIG. 4 is a diagram showing a distortion curve of the vehicle lens according to the first embodiment of the present disclosure.

In this embodiment, the curves of the MTF, the field curvature, and the distortion are shown in FIG. 2, FIG. 3, and FIG. 4, respectively. From FIG. 2 to FIG. 4, it is apparent that the MTF values of this embodiment are very high, indicating that the vehicle lens 10 provided by this embodiment has high resolution characteristics. As can be seen from the field curvature curves and the distortion curve of this embodiment, the field curvature and the distortion can be well corrected in this embodiment.

Embodiment 2

Figure 5:
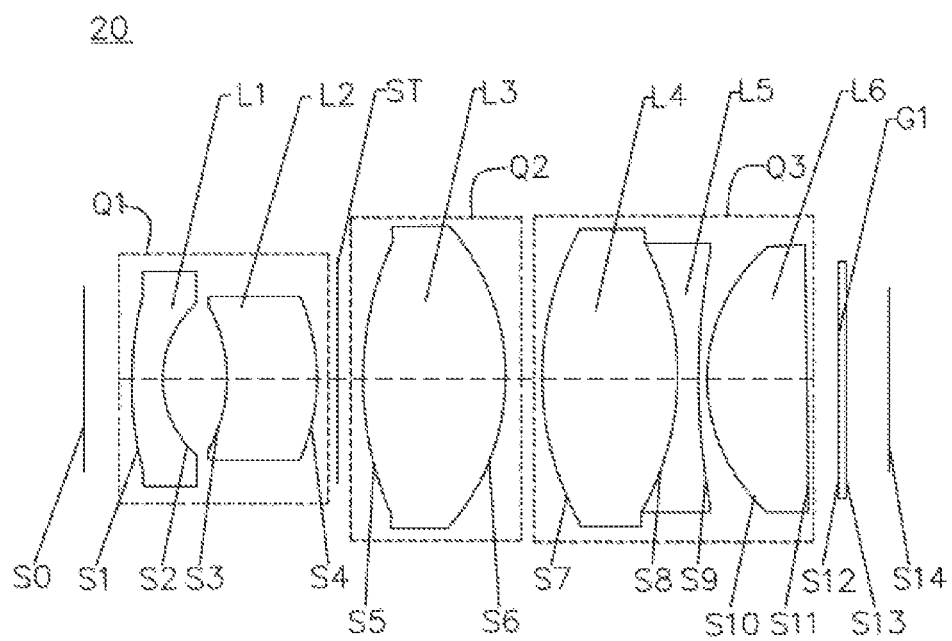
FIG. 5 is a schematic structural diagram of a vehicle lens according to a second embodiment of the disclosure.

Please refer to FIG. 5, a vehicle lens 20 provided in this embodiment is substantially similar to the vehicle lens 10 in the first embodiment, the differences are: the radius of curvature and the material of every lens are different. The specific parameters of every lens are shown in Table 3.

TABLE 3

| Surface No. | Sign | Surface type | Radius of curvature | Thickness | Refractive index | Abbe number |
|---|---|---|---|---|---|---|
| Object surface S0 | S0 | plane | Infinity | Infinity | — | — |
| S1 | L1 | Aspheric surface | 8.239 | 1.112 | 1.81 | 40.7 |
| S2 | | Aspheric surface | 3.401 | 2.580 | — | — |
| S3 | L2 | Spherical surface | −7.494 | 4.193 | 2.00 | 25.4 |
| S4 | | Spherical surface | −9.523 | 0.101 | — | — |
| ST | ST | Spherical surface | Infinity | 2.312 | — | — |
| S5 | L3 | Aspheric surface | 13.467 | 6.508 | 1.50 | 81.6 |
| S6 | | Aspheric surface | −10.127 | 2.096 | — | — |
| S7 | L4 | Spherical surface | 13.876 | 5.390 | 1.64 | 60.2 |
| S8 | L5 | Spherical surface | −14.702 | 0.639 | 1.92 | 18.9 |
| S9 | | Spherical surface | 24.929 | 0.110 | — | — |
| S10 | L6 | Aspheric surface | 7.649 | 4.667 | 1.59 | 61.3 |
| S11 | | Aspheric surface | 36.991 | 0.523 | — | — |
| S12 | G1 | Plane | Infinity | 0.5 | 1.52 | 64.2 |
| S13 | | Plane | Infinity | 2.877 | — | — |
| Imaging surface S14 | S14 | Plane | Infinity | | — | — |

In addition, the parameters of every aspheric lens in this embodiment are shown in Table 4:

TABLE 4

| Surface No. | K | B | C | D | E | F |
|---|---|---|---|---|---|---|
| S1 | −6.91045 | −0.00302 | 0.000162 | −4.23E−06 | 4.22E−08 | 1.18E−10 |
| S2 | −4.193879 | 0.005271 | −0.00068 | 8.78E−05 | −5.51E−06 | 1.68E−07 |
| S5 | −9.559317 | 0.00025 | −6.50E−06 | 1.60E−07 | −1.83E−09 | 3.67E−12 |
| S6 | −6.723054 | −0.00092 | 2.16E−05 | −4.76E−07 | 7.79E−09 | −5.54E−11 |
| S10 | −2.872546 | 0.000203 | 2.42E−06 | −7.89E−08 | 1.94E−09 | 2.17E−11 |
| S11 | −39.10663 | −0.00055 | 1.75E−05 | −3.49E−07 | 7.22E−09 | 6.00E−11 |

Figure 6:
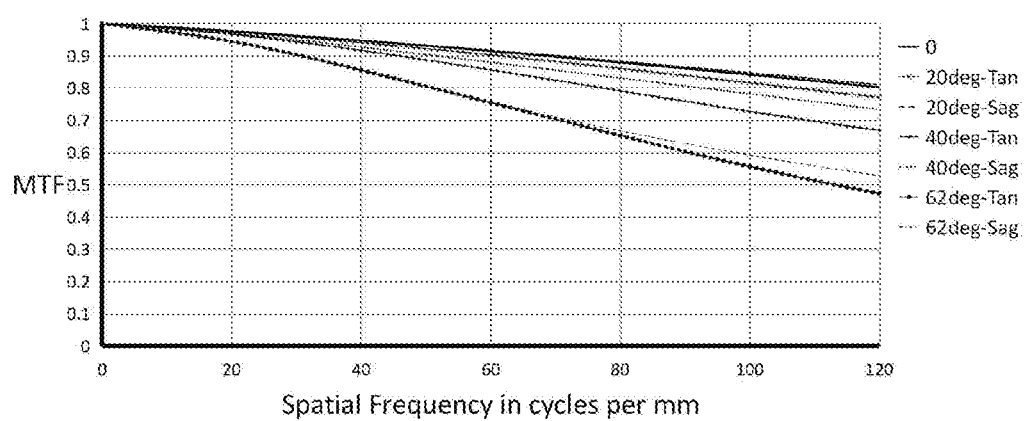
FIG. 6 is a diagram showing MTF curves of the vehicle lens according to the second embodiment of the disclosure.
Figure 7:
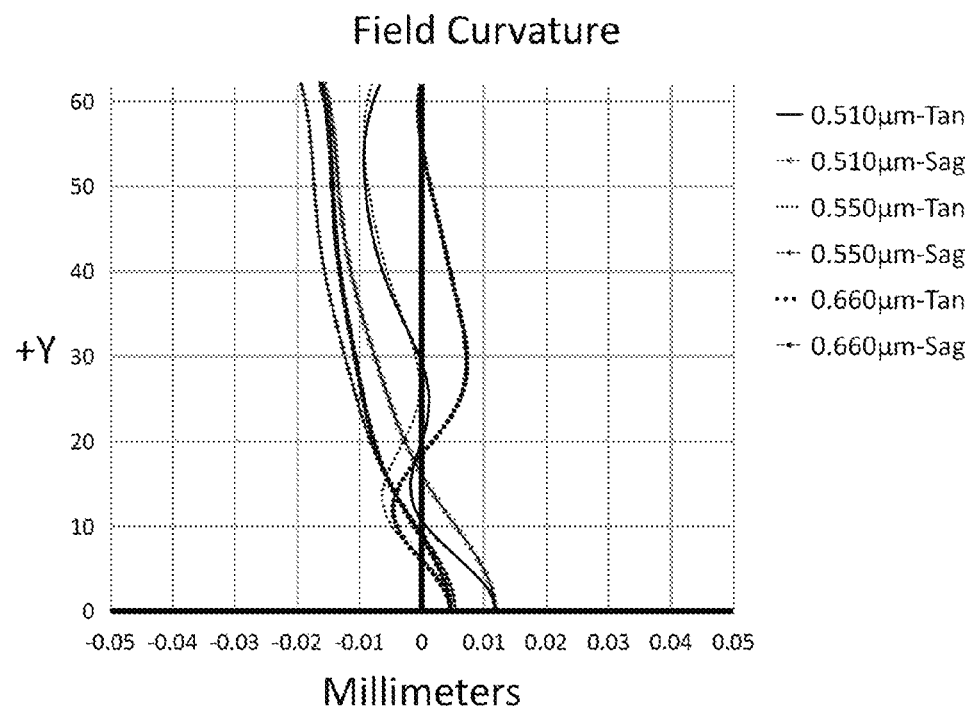
FIG. 7 is a diagram showing field curvature curves of the vehicle lens according to the second embodiment of the present disclosure.
Figure 8:
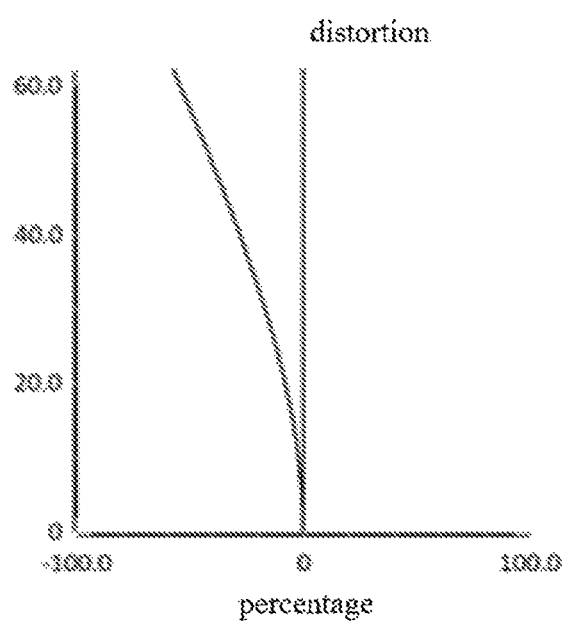
FIG. 8 is a diagram showing a distortion curve of the vehicle lens according to the second embodiment of the present disclosure.

In this embodiment, the curves of the MTF, the field curvature, and the distortion are shown in FIG. 6, FIG. 7, and FIG. 8, respectively. From FIG. 6 to FIG. 8, it is apparent that the MTF values of this embodiment are very high, indicating that the vehicle lens 20 provided by this embodiment has high resolution characteristics. As can be seen from the field curvature curves and the distortion curve of this embodiment, the field curvature and the distortion can be well corrected in this embodiment.

Embodiment 3

Figure 9:
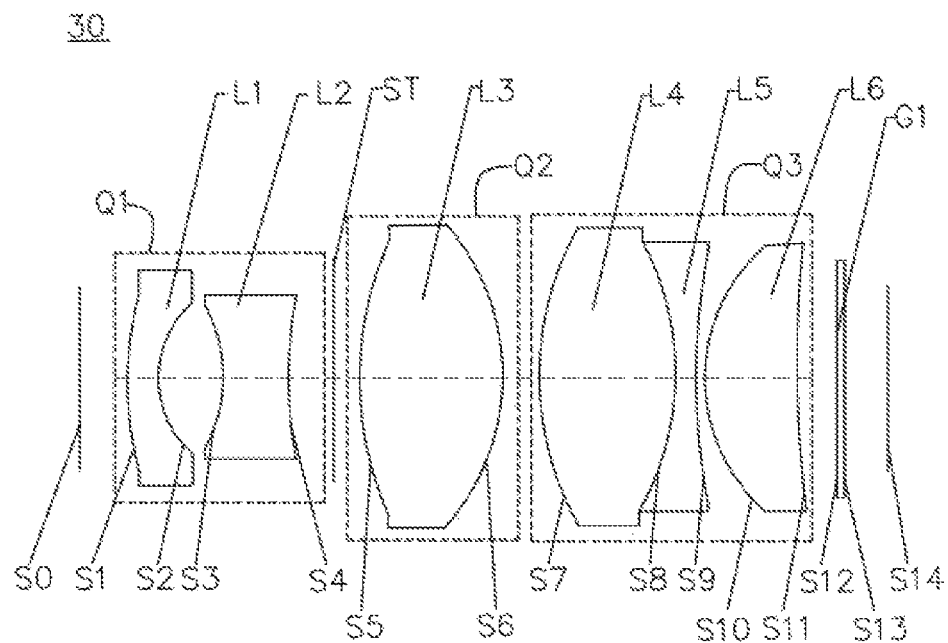
FIG. 9 is a schematic structural diagram of a vehicle lens according to a third embodiment of the disclosure.

Please refer to FIG. 9, a vehicle lens 30 provided in this embodiment is substantially similar to the vehicle lens 10 in the first embodiment, the differences are: a second lens L2 of the vehicle lens provided in this embodiment has a negative refractive power and a concave image side surface; a sixth lens L6 has a convex image side surface; and the radius of curvature and the material of every lens of the vehicle lens are different. The specific parameters of every lens are shown in Table 5.

TABLE 5

| Surface No. | Sign | Surface type | Radius of curvature | Thickness | Refractive index | Abbe number |
|---|---|---|---|---|---|---|
| Object surface S0 | S0 | plane | Infinity | Infinity | — | — |
| S1 | L1 | Aspheric surface | 5.871 | 1.149 | 1.81 | 40.7 |
| S2 | | Aspheric surface | 2.941 | 2.297 | — | — |
| S3 | L2 | Spherical surface | −10.531 | 1.905 | 1.52 | 64.2 |
| S4 | | Spherical surface | 40.461 | 0.605 | — | — |
| ST | ST | Spherical surface | Infinity | 0.993 | — | — |
| S5 | L3 | Aspheric surface | 15.655 | 6.631 | 1.62 | 63.9 |
| S6 | | Aspheric surface | −7.523 | 2.054 | — | — |
| S7 | L4 | Spherical surface | 11.042 | 7.005 | 1.73 | 51.5 |
| S8 | L5 | Spherical surface | −12.461 | 0.700 | 1.92 | 18.9 |
| S9 | | Spherical surface | 15.625 | 0.120 | — | — |
| S10 | L6 | Aspheric surface | 8.440 | 3.418 | 1.59 | 61.3 |
| S11 | | Aspheric surface | −74.067 | 0.523 | — | — |
| S12 | G1 | Plane | Infinity | 0.500 | 1.52 | 64.2 |
| S13 | | Plane | Infinity | 3.17 | — | — |
| Imagine surface S14 | S14 | Plane | Infinity | | — | — |

In addition, the parameters of every aspheric lens in this embodiment are shown in Table 6:

TABLE 6

| Surface No. | K | B | C | D | E | F |
|---|---|---|---|---|---|---|
| S1 | −0.67 | −0.004873453 | 0.000128807 | 1.21E−06 | −1.76E−07 | 3.21E−09 |
| S2 | −3.49 | 0.00642303 | −0.001067309 | 0.000136135 | −8.58E−06 | 2.60E−07 |
| S5 | −4.91 | −0.000318204 | 6.65E−06 | −2.02E−07 | −2.60E−10 | 4.90E−11 |
| S6 | −0.68 | −0.000125531 | 7.29E−07 | −1.15E−07 | 3.54E−09 | −5.73E−11 |
| S10 | −0.45 | −5.95E−05 | 4.73E−06 | −1.40E−07 | 3.64E−09 | −1.12E−10 |
| S11 | −28.72 | 8.86E−05 | 1.29E−05 | −1.54E−09 | −1.21E−08 | 1.15E−10 |

Figure 10:
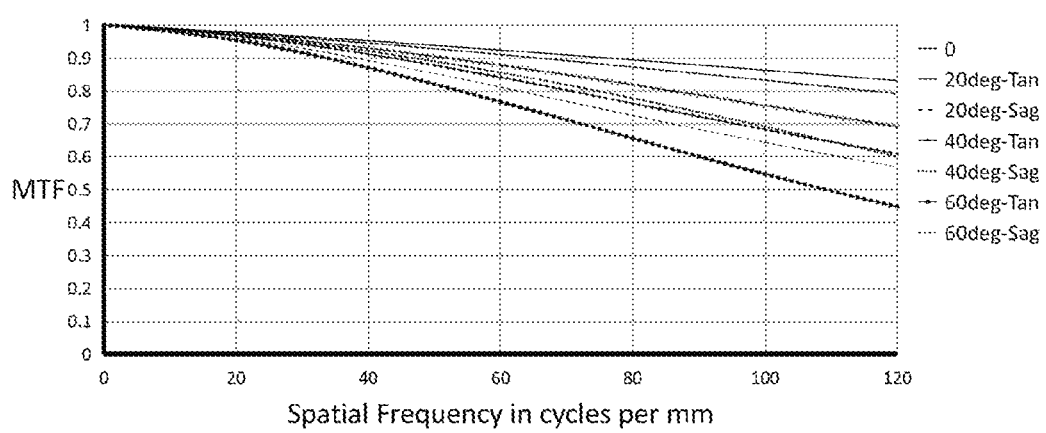
FIG. 10 is a diagram showing MTF curves of the vehicle lens according to the third embodiment of the disclosure.
Figure 11:
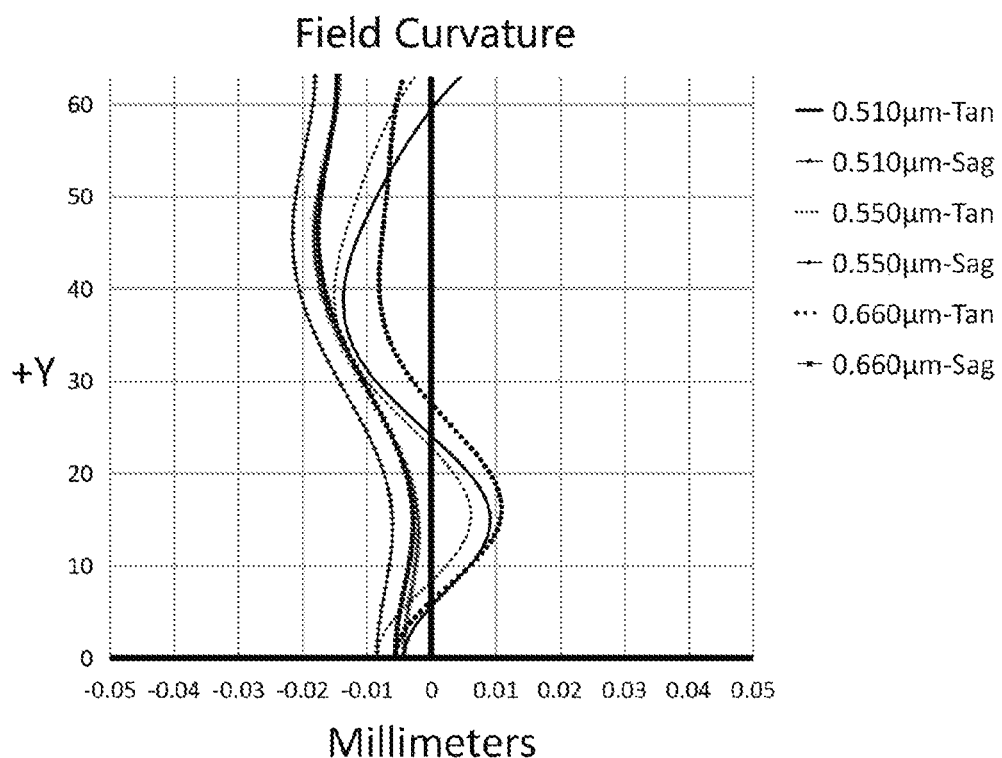
FIG. 11 is a diagram showing field curvature curves of the vehicle lens according to the third embodiment of the present disclosure.
Figure 12:
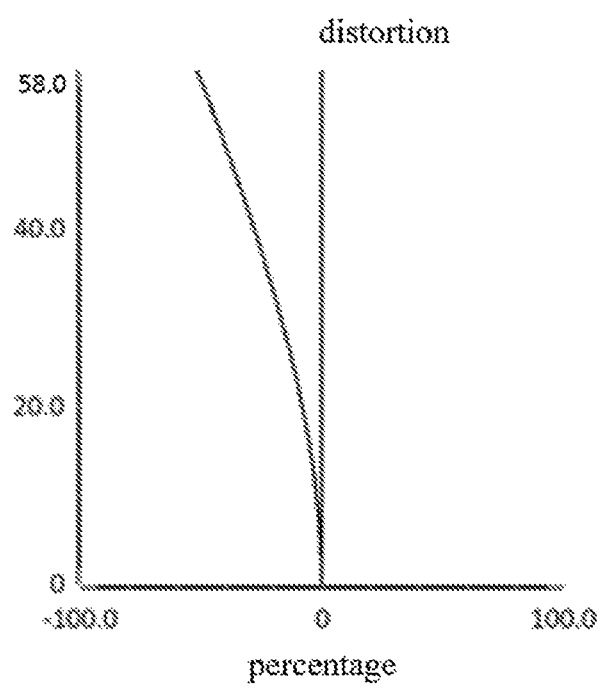
FIG. 12 is a diagram showing a distortion curve of the vehicle lens according to the third embodiment of the present disclosure.

In this embodiment, the curves of the MTF, the field curvature, and the distortion are shown in FIG. 10, FIG. 11, and FIG. 12, respectively. From FIG. 10 to FIG. 12, it is apparent that the MTF values of this embodiment are very high, indicating that the vehicle lens 30 provided by this embodiment has high resolution characteristics. As can be seen from the field curvature curves and the distortion curve of this embodiment, the field curvature and the distortion can be well corrected in this embodiment.

Embodiment 4

Figure 13:
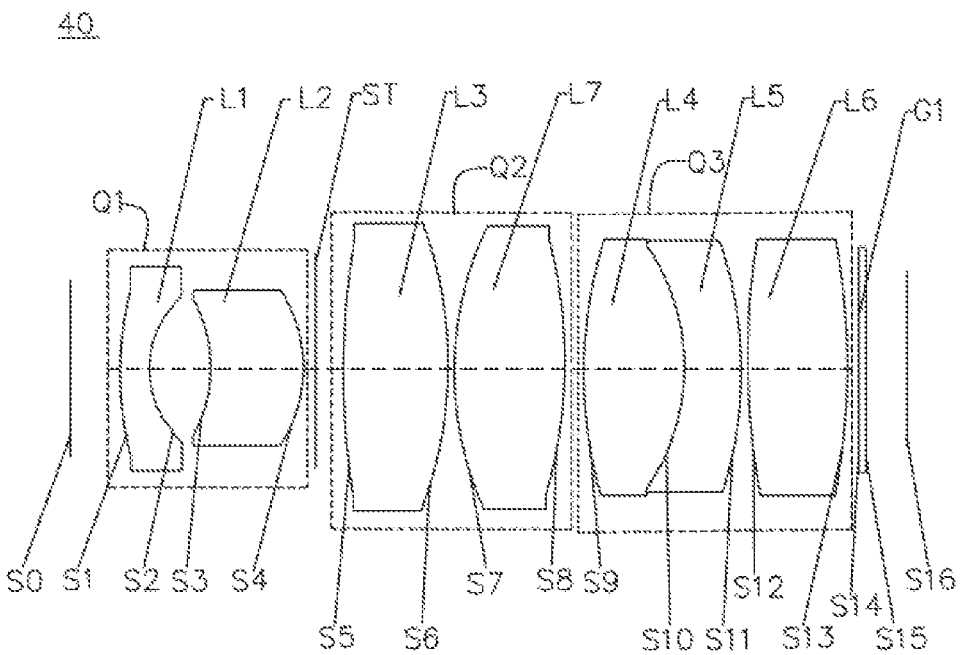
FIG. 13 is a schematic structural diagram of a vehicle lens according to a fourth embodiment of the disclosure.

Please refer to FIG. 13, an embodiment provides a vehicle lens 40, from an object side S0 to an image side S16 thereof, the vehicle lens 40 sequentially includes: a first group Q1 with a negative refractive power, a stop ST, a second group Q2 with a positive refractive power, and a third group Q3 with a positive refractive power.

The first group Q1 includes a first lens L1 and a second lens L2 from the object side S0 to the image side S16. The first lens L1 has a negative refractive power, an object side surface S1 of the first lens L1 is convex meanwhile an image side surface S2 of the first lens L1 is concave, the first lens L1 is a glass aspherical lens. An object side surface S3 of the second lens L2 is concave and an image side surface S4 of the second lens L2 is convex. The second lens L2 is a glass spherical lens.

The second group Q2 includes a third lens L3 and a seventh lens L7 from the object side S0 to the image side S16. The third lens L3 has a positive refractive power, an object side surface S5 and an image side surface S6 of the third lens L3 are both convex surfaces, and the third lens L3 is a glass spherical lens. The seventh lens L7 has a positive refractive power, an object side surface S7 and an image side surface S8 of the seventh lens L7 are both convex surfaces, and the seventh lens L7 is a glass aspheric lens.

The third group Q3 includes a fourth lens L4, a fifth lens L5, and a sixth lens L6, from the object side S0 to the image side S16. The fourth lens L4 has a positive refractive power, and an object side surface S9 and an image side surface S10 of the fourth lens L4 are both convex surfaces. The fourth lens L4 is a glass spherical lens. The fifth lens L5 has a negative refractive power, an object side surface S8 of the fifth lens L5 is concave and an image side surface S11 of the fifth lens L5 is concave. The fifth lens L5 is a glass spherical lens. The sixth lens L6 has a positive refractive power, an object side surface S12 and an image side surface S13 of the sixth lens L6 are both convex. The sixth lens L6 is a glass aspheric lens. The fourth lens L4 and the fifth lens L5 are cemented as a cemented body, and S10 is a cemented surface.

A filter G1 is disposed between the third group Q3 and an imaging surface S16, an object side surface of the filter G1 is S14 and an image side surface of the filter G1 is S15.

Relevant parameters of every lens in the vehicle lens provided by this embodiment are shown in Table 7:

TABLE 7

| Surface No. | Sign | Surface type | Radius of curvature | Thickness | Refractive index | Abbe number |
|---|---|---|---|---|---|---|
| Object surface S0 | S0 | plane | Infinity | Infinity | — | — |
| S1 | L1 | Aspheric surface | 5.750 | 1.061 | 1.81 | 40.7 |
| S2 | | Aspheric surface | 2.785 | 2.917 | — | — |
| S3 | L2 | Spherical surface | −5.726 | 4.849 | 1.71 | 53.9 |
| S4 | | Spherical surface | −8.285 | −0.620 | — | — |
| ST | ST | Spherical surface | Infinity | 1.136 | 1.70 | 55.5 |
| S5 | L3 | Spherical surface | 14.878 | 4.402 | | |
| S6 | | Spherical surface | −43.128 | 0.616 | | |
| S7 | L7 | Aspheric surface | 12.364 | 4.782 | 1.50 | 81.6 |
| S8 | | Aspheric surface | −20.525 | 0.120 | — | — |
| S9 | L4 | Spherical surface | 27.200 | 4.137 | 1.50 | 81.6 |
| S10 | L5 | Spherical surface | −7.365 | 1.033 | 1.95 | 17.9 |
| S11 | | Spherical surface | −32.553 | 0.200 | — | — |
| S12 | L6 | Aspheric surface | 18.217 | 4.098 | 1.69 | 53.2 |
| S13 | | Aspheric surface | −177.572 | 0.523 | — | — |
| S14 | G1 | Plane | Infinity | 0.500 | 1.52 | 64.2 |
| S15 | | Plane | Infinity | 2.536 | — | — |
| Imaging surface S16 | S16 | Plane | Infinity | | — | — |

In addition, the parameters of every aspheric lens in this embodiment are shown in Table 8:

TABLE 8

| Surface No. | K | B | C | D | E | F |
|---|---|---|---|---|---|---|
| S1 | −0.17 | −0.00676 | 0.000293 | −9.28E−06 | 1.61E−07 | −1.45E−09 |
| S2 | −2.49 | 0.001044 | −0.00012 | 2.72E−05 | −1.51E−06 | 4.30E−08 |
| S7 | −1.19 | 5.26E−06 | 6.17E−06 | −1.11E−07 | 3.18E−09 | −7.12E−12 |
| S8 | −2.76 | −9.60E−05 | 1.69E−05 | −2.54E−07 | 2.54E−09 | 9.30E−11 |
| S12 | 5.84 | −0.00092 | 1.42E−05 | −4.56E−07 | 8.20E−09 | −1.96E−11 |
| S13 | 29.99 | −0.00118 | 2.04E−05 | −1.30E−07 | −7.30E−09 | 1.93E−10 |

Figure 14:
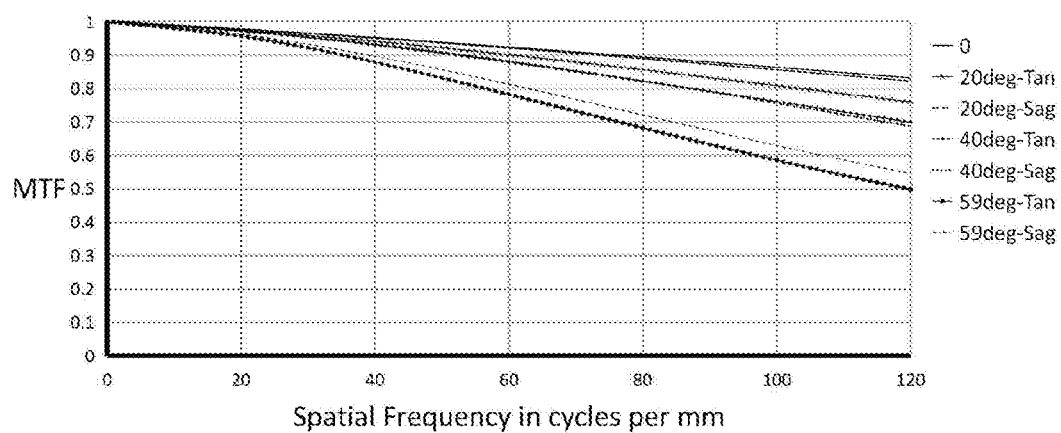
FIG. 14 is a diagram showing MTF curves of the vehicle lens according to the fourth embodiment of the disclosure.
Figure 15:
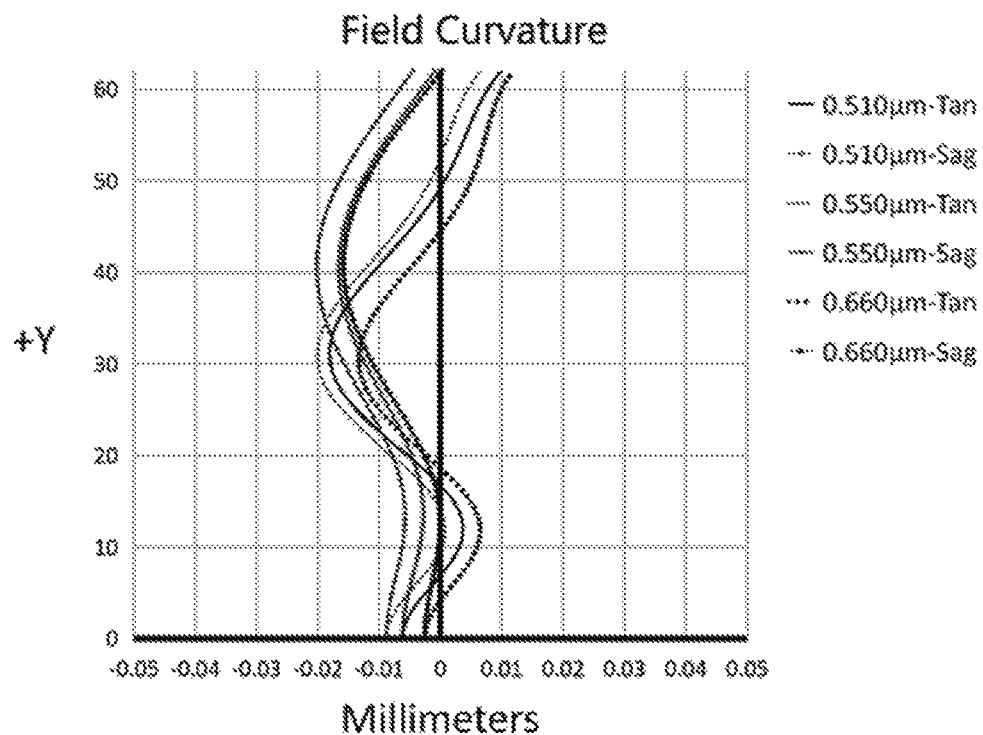
FIG. 15 is a diagram showing field curvature curves of the optical lens system according to the fourth embodiment of the present disclosure.
Figure 16:
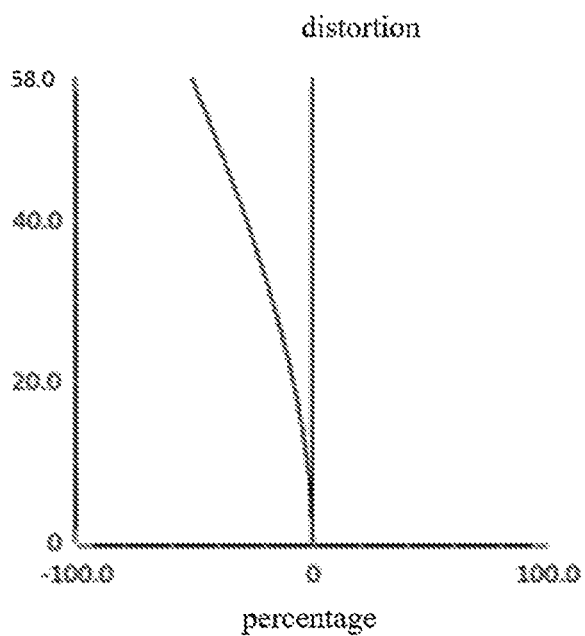
FIG. 16 is a diagram showing a distortion curve of the vehicle lens according to the fourth embodiment of the present disclosure.

In this embodiment, the curves of the MTF, the field curvature, and the distortion are shown in FIG. 14, FIG. 15, and FIG. 16, respectively. From FIG. 14 to FIG. 16, it is apparent that the MTF values of this embodiment are very high, indicating that the vehicle lens 40 provided by this embodiment has high resolution characteristics. As can be seen from the field curvature curves and the distortion curve of this embodiment, the field curvature and the distortion can be well corrected in this embodiment.

Embodiment 5

Figure 17:
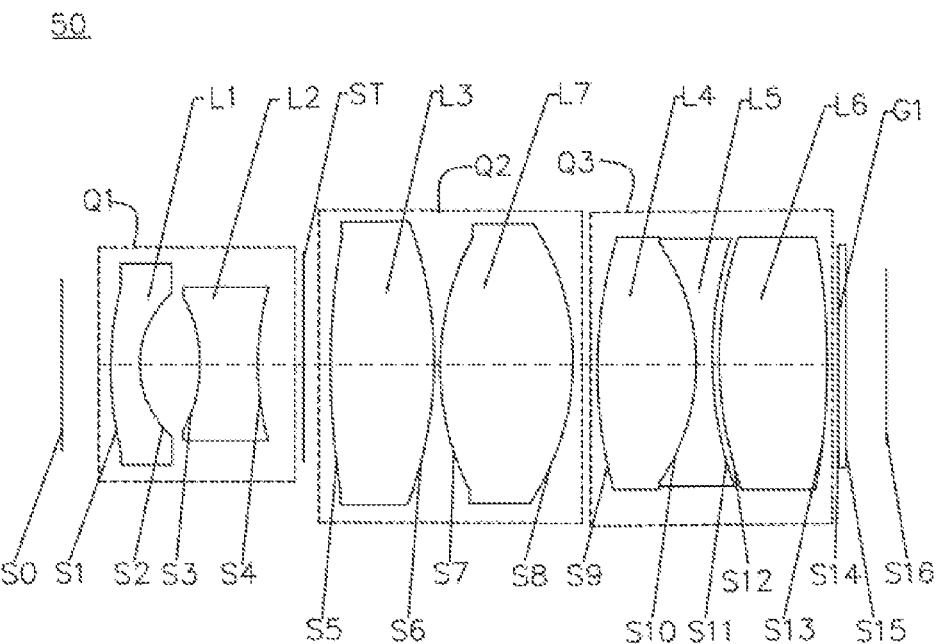
FIG. 17 is a schematic structural diagram of a vehicle lens according to a fifth embodiment of the disclosure.

Please refer to FIG. 17, a vehicle lens 50 provided in this embodiment is substantially similar to the vehicle lens 40 in the fourth embodiment, the differences are: a second lens L2 of the vehicle lens 50 provided in this embodiment has a concave image side surface S4; a fifth lens L5 has a concave image side surface S11; and the radius of curvature and the material of every lens of the vehicle lens are different. The specific parameters of every lens are shown in Table 9.

TABLE 9

| Surface No. | Sign | Surface type | Radius of curvature | Thickness | Refractive index | Abbe number |
|---|---|---|---|---|---|---|
| Object surface S0 | S0 | plane | Infinity | Infinity | — | — |
| S1 | L1 | Aspheric surface | 6.845 | 1.120 | 1.81 | 40.7 |
| S2 | | Aspheric surface | 3.119 | 2.144 | — | — |
| S3 | L2 | Spherical surface | −9.045 | 1.609 | 1.60 | 65.5 |
| S4 | | Spherical surface | 34.097 | 0.503 | — | — |
| ST | ST | Spherical surface | Infinity | −0.076 | 1.70 | 30.1 |
| S5 | L3 | Spherical surface | 21.719 | 4.401 | | |
| S6 | | Spherical surface | −18.896 | 0.120 | | |
| S7 | L7 | Aspheric surface | 15.495 | 5.049 | 1.55 | 71.7 |
| S8 | | Aspheric surface | −10.213 | 0.120 | — | — |
| S9 | L4 | Spherical surface | 14.960 | 5.368 | 1.69 | 53.3 |
| S10 | L5 | Spherical surface | −8.553 | 0.700 | 1.81 | 22.7 |
| S11 | | Spherical surface | 12.831 | 0.344 | — | — |
| S12 | L6 | Aspheric surface | 8.2.41 | 6.025 | 1.77 | 49.5 |
| S13 | | Aspheric surface | −674.096 | 0.523 | — | — |
| S14 | G1 | Plane | Infinity | 0.400 | 1.52 | 64.2 |
| S15 | | Plane | Infinity | 3.12 | — | — |
| Imaging surface S16 | S16 | Plane | Infinity | | — | — |

In addition, the parameters of every aspheric lens in this embodiment are shown in Table 10:

TABLE 10

| Surface No. | K | B | C | D | E | F |
|---|---|---|---|---|---|---|
| S1 | 0.66 | −0.00546 | 0.000184 | −3.96E−06 | — | — |
| S2 | −0.36 | −0.00773 | 0.000265 | −8.01E−06 | — | — |
| S7 | −7.96 | −4.76E−05 | 9.36E−07 | −7.57E−08 | 8.72E−11 | — |
| S8 | 0.57 | −0.00018 | 7.37E−06 | −7.19E−08 | 1.14E−10 | — |
| S12 | −1.08 | −0.00042 | 1.02E−05 | −2.77E−07 | 3.21E−09 | — |
| S13 | 29.88 | −0.00044 | 9.04E−06 | −2.41E−07 | 3.24E−09 | — |

Figure 18:
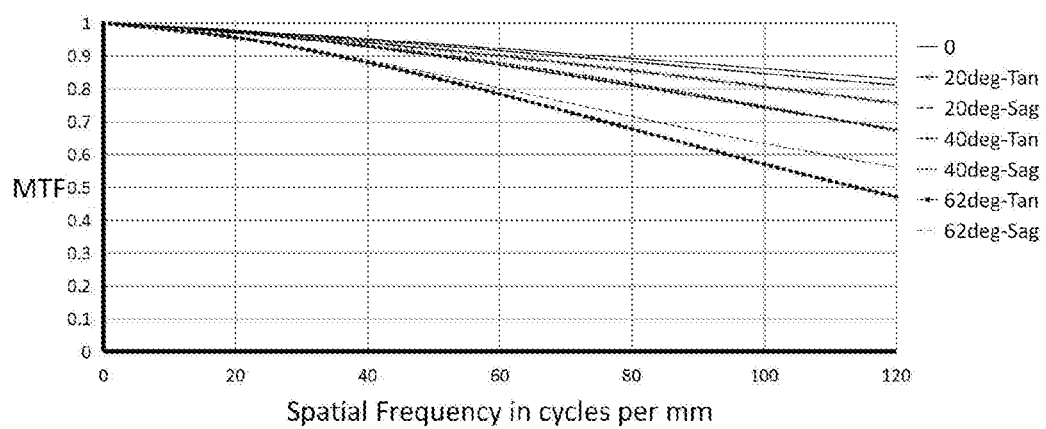
FIG. 18 is a diagram showing MTF curves of the vehicle lens according to the fifth embodiment of the disclosure.
Figure 19:
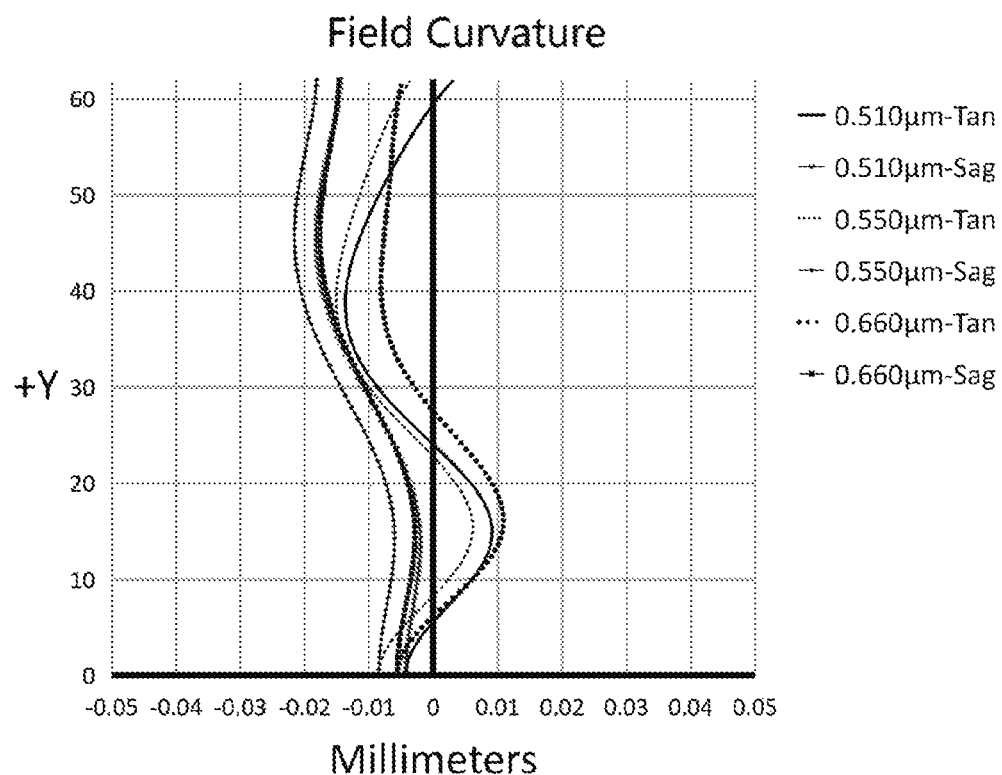
FIG. 19 is a diagram showing field curvature curves of the vehicle lens according to the fifth embodiment of the present disclosure.
Figure 20:
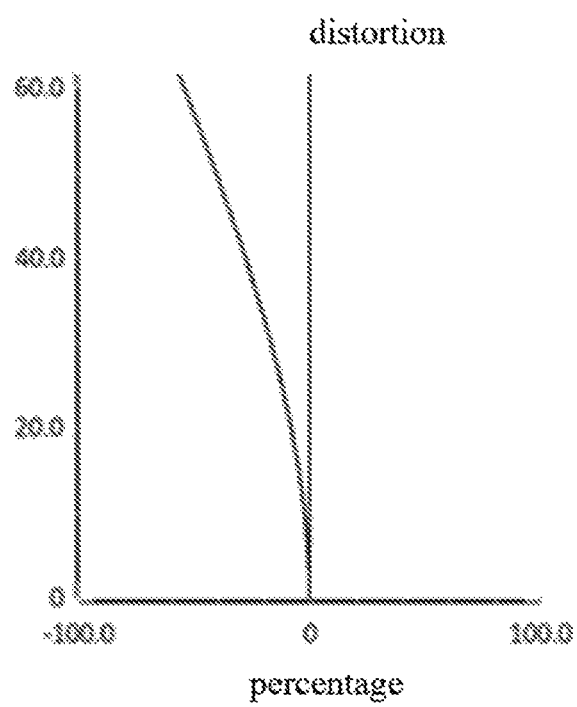
FIG. 20 is a diagram showing a distortion curve of the vehicle lens according to the fifth embodiment of the present disclosure.

In this embodiment, the curves of the MTF, the field curvature, and the distortion are shown in FIG. 18, FIG. 19, and FIG. 20, respectively. From FIG. 18 to FIG. 20, it is apparent that the MTF values of this embodiment are very high, indicating that the vehicle lens 50 provided by this embodiment has high resolution characteristics. As can be seen from the field curvature curves and the distortion curve of this embodiment, the field curvature and the distortion can be well corrected in this embodiment.

Embodiment 6

Figure 21:
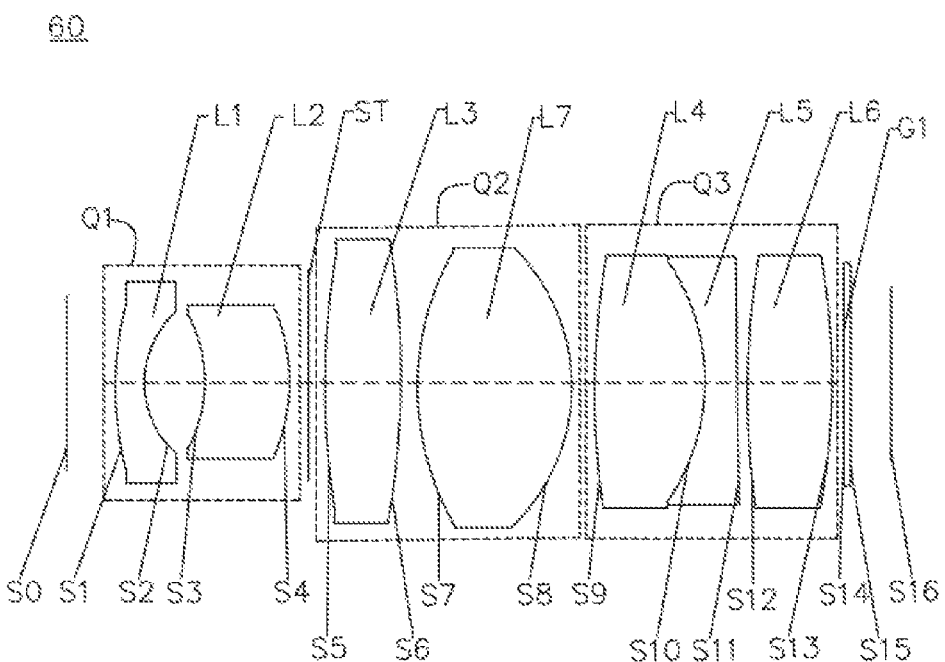
FIG. 21 is a schematic structural diagram of a vehicle lens according to a sixth embodiment of the disclosure.

Please refer to FIG. 21, a vehicle lens 60 provided in this embodiment is substantially similar to the vehicle lens 40 in the fourth embodiment, the differences are: a fifth lens L5 of the vehicle lens 60 provided in this embodiment has a concave image side surface S11; and the radius of curvature and the material of every lens of the vehicle lens are different. The specific parameters of every lens are shown in Table 11.

TABLE 11

| Surface No. | Sign. | Surface type | Radius of curvature | Thickness | Refractive index | Abbe number |
|---|---|---|---|---|---|---|
| Object surface S0 | S0 | plane | Infinity | Infinity | — | — |
| S1 | L1 | Aspheric surface | 9.070 | 1.269 | 1.81 | 40.7 |
| S2 | | Aspheric surface | 3.456 | 2.588 | — | — |
| S3 | L2 | Spherical surface | −6.026 | 3.916 | 1.91 | 35.3 |
| S4 | | Spherical surface | −9.490 | −0.520 | — | — |
| ST | ST | Spherical surface | Infinity | 0.657 | 1.77 | 49.6 |
| S5 | L3 | Spherical surface | 26.720 | 3.528 | | |
| S6 | | Spherical surface | −26.720 | 1.516 | | |
| S7 | L7 | Aspheric surface | 12.806 | 5.313 | 1.50 | 81.6 |
| S8 | | Aspheric surface | −8.409 | 0.113 | — | — |
| S9 | L4 | Spherical surface | 39.966 | 5.354 | 1.64 | 60.2 |
| S10 | L5 | Spherical surface | −8.732 | 1.366 | 1.92 | 18.9 |
| s11 | | Spherical surface | 93.247 | 0.167 | — | — |
| S12 | L6 | Aspheric surface | 17.433 | 3.622 | 1.58 | 59.5 |
| S13 | | Aspheric surface | −159.769 | 0.300 | — | — |
| S14 | G1 | Plane | Infinity | 0.500 | 1.52 | 64.2 |
| S15 | | Plane | Infinity | 2.593 | — | — |
| Imaging surface | S16 | Plane | Infinity | | — | — |

In addition, the parameters of every aspheric lens in this embodiment are shown in Table 12:

TABLE 12

| Surface No. | K | B | C | D | E | F |
|---|---|---|---|---|---|---|
| S1 | 0.025 | −0.00381 | 0.000161 | −3.14E−06 | −1.65E−08 | 1.23E−09 |
| S2 | −0.029 | −0.00658 | 0.000244 | −2.70E−05 | 2.51E−06 | −1.82E−07 |
| S7 | −2.39 | −5.01E−05 | 2.34E−06 | −6.77E−08 | 6.29E−10 | 4.25E−12 |
| S8 | −2.79 | −0.00015 | 4.11E−06 | −3.70E−08 | −8.45E−10 | 2.06E−11 |
| S12 | −6.58 | −0.00014 | −3.08E−07 | −4.04E−07 | 5.24E−09 | 8.06E−11 |
| S13 | 2.96 | −0.0015 | 3.49E−05 | −1.02E−06 | 2.08E−08 | −1.58E−10 |

Figure 22:
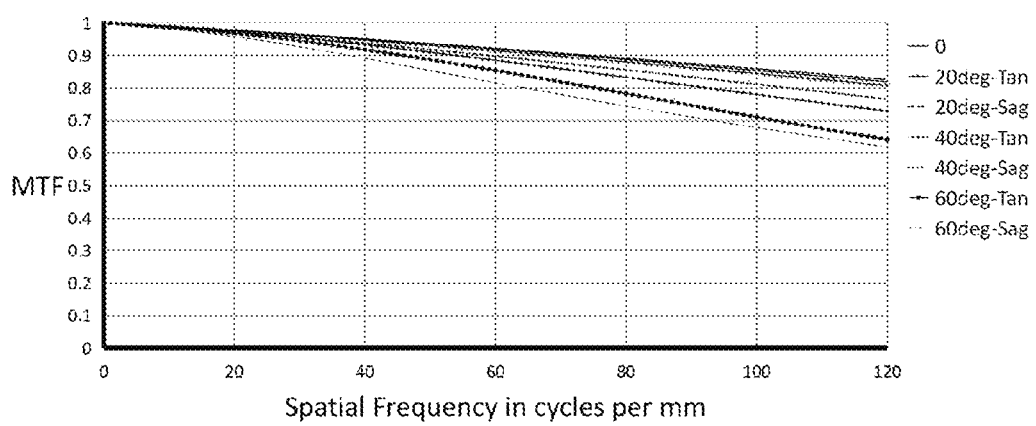
FIG. 22 is a diagram showing MTF curves of the vehicle lens according to the sixth embodiment of the disclosure.
Figure 23:
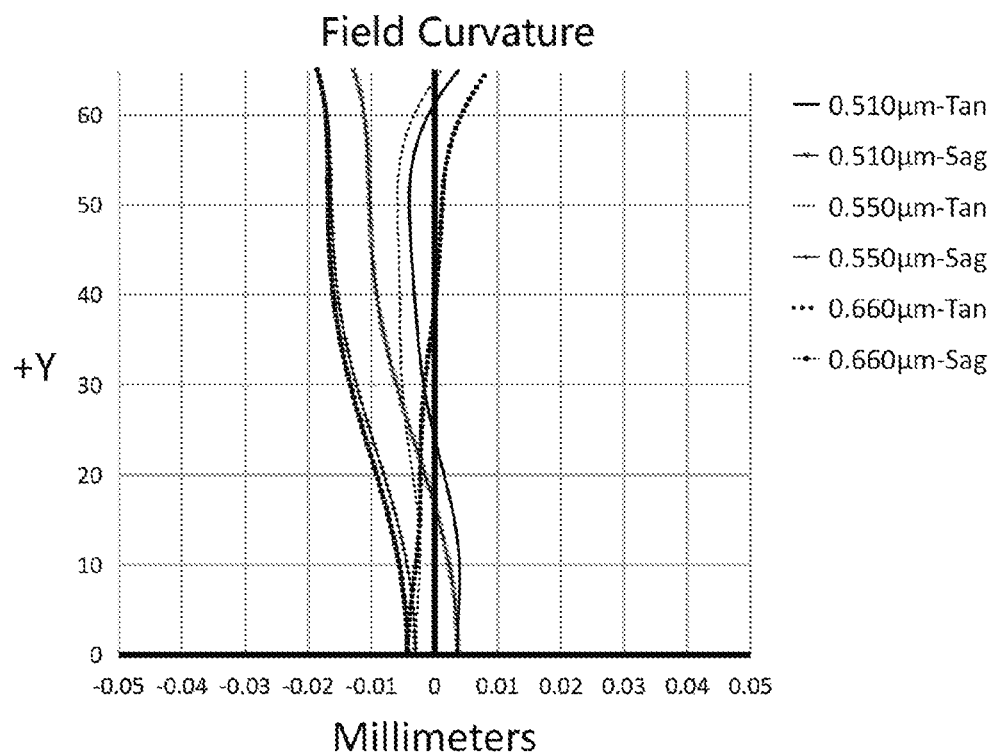
FIG. 23 is a diagram showing field curvature curves of the vehicle lens according to the sixth embodiment of the present disclosure.
Figure 24:
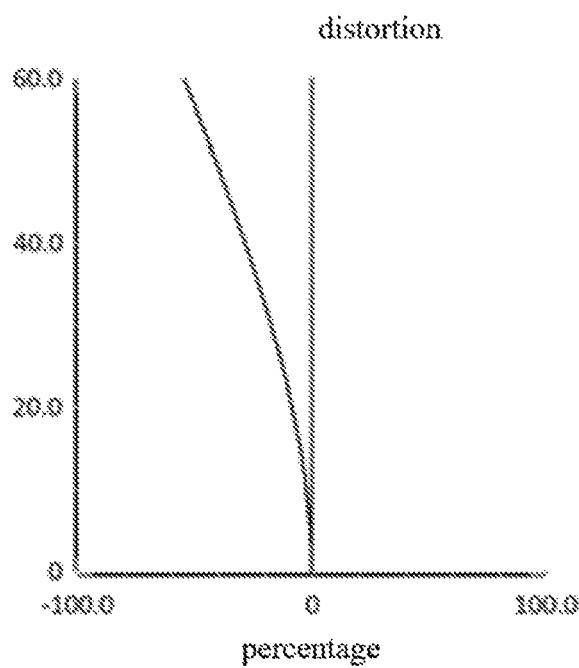
FIG. 24 is a diagram showing a distortion curve of the vehicle lens according to the sixth embodiment of the present disclosure.

In this embodiment, the curves of the MTF, the field curvature, and the distortion are shown in FIG. 22, FIG. 23, and FIG. 24, respectively. From FIG. 22 to FIG. 24, it is apparent that the MTF values of this embodiment are very high, indicating that the vehicle lens 50 provided by this embodiment has high resolution characteristics. As can be seen from the field curvature curves and the distortion curve of this embodiment, the field curvature and the distortion can be well corrected in this embodiment.

Table 13 shows optical characteristics corresponding to the above six embodiments, including the system focal length f, the F number F #, the FOV the system optical total length TTL, and other values corresponding to every expression.

TABLE 13

| Expression | Embodiment 1 | Embodiment 2 | Embodiment 3 | Embodiment 4 | Embodiment 5 | Embodiment 6 |
|---|---|---|---|---|---|---|
| f (mm) | 5.12 | 5.10 | 5.13 | 5.11 | 5.10 | 5.12 |
| TTL(mm) | 33.23 | 33.78 | 31.24 | 32.47 | 31.67 | 32.46 |
| F# | 1.45 | 1.5 | 1.5 | 1.48 | 1.48 | 1.43 |

TABLE 13-continued

| Expression | Embodiment 1 | Embodiment 2 | Embodiment 3 | Embodiment 4 | Embodiment 5 | Embodiment 6 |
|---|---|---|---|---|---|---|
| FOV | 134° | 126° | 122° | 124° | 126° | 130° |
| $IH_\theta$ (mm) | 4.25 | 4.14 | 4.07 | 4.10 | 4.13 | 4.21 |
| $D_2/D_1$ | 2.63 | 2.73 | 2.57 | 2.62 | 2.5 | 2.8 |
| $f_{Q1}/f$ | −2.11 | −2.03 | −1.03 | −1.85 | −0.86 | −1.42 |
| $f_{Q2}/f$ | 2.43 | 2.5 | 1.78 | 1.81 | 1.5 | 1.6 |
| $(IH_\theta - f*\theta)/(f*\theta)$ | −0.29 | −0.262 | −0.2.52 | −0.259 | −0.263 | −0.275 |
| $R_{11}/f$ | 1.63 | 1.61 | 1.14 | 1.12 | 1.34 | 1.77 |
| $R_{21}/f$ | −1.4 | −1.47 | −2.05 | −1.12 | −1.77 | −1.18 |
| $T_{11}/f$ | 0.11 | 0.14 | 0.2 | 0.18 | 0.16 | 0.15 |
| $T_{Q2}/f$ | 1.2 | 1.27 | 1.29 | 1.8 | 1.85 | 1.72 |
| $(dn/dt)_{Q2}$ ($10^{-6}/°C.$) | −5.6 | −5.6 | −4.2 | −2.7 | −4.5 | −1 |
| $TTL/f/IH_\theta$ | 1.45 | 1.6 | 1.5 | 1.55 | 1.5 | 1.51 |

As can be seen from the diagrams showing MTF curves in the above embodiments, the MTF values are very high, which indicates that the vehicle lens provided by the disclosure has high resolution characteristics; the F number of the above embodiments are all less than or equal to 1.5, which indicates that the vehicle lens provided by the disclosure has a characteristic of large aperture. The smaller the F number, the larger the amount of light flux, and the better the imaging effect in a dim environment.

Embodiment 7

Figure 25:
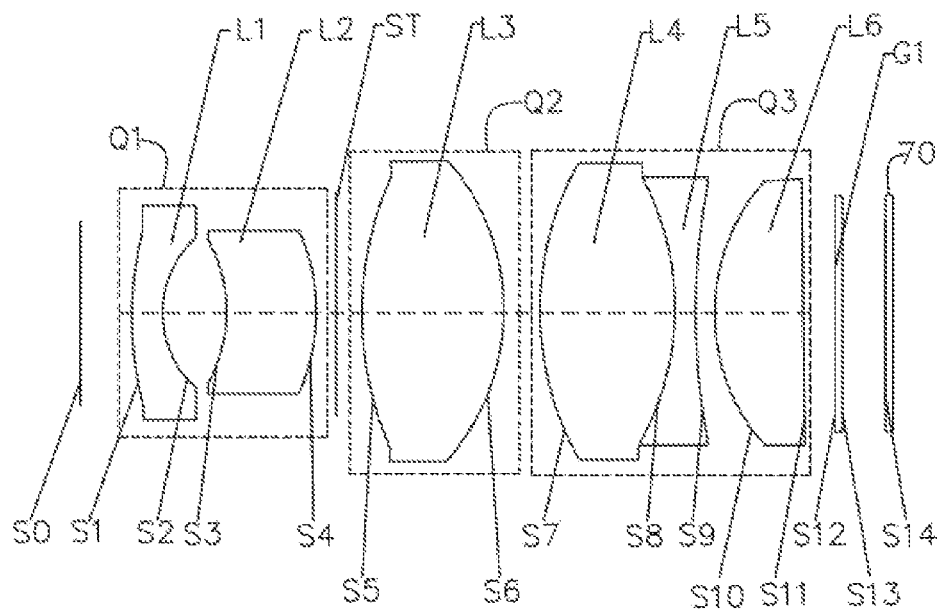
FIG. 25 is a schematic structural diagram of an imaging device according to a seventh embodiment of the disclosure.

As shown in FIG. 25, an embodiment provides an imaging device 100, which includes a vehicle lens of any one of the foregoing embodiments (for example, the vehicle lens 10) and an imaging component 70. The imaging element 70 convert an optical image formed by the vehicle lens 10 into electrical signals.

The imaging component 70 may be a Complementary Metal Oxide Semiconductor (CMOS) image sensor, or a Charge Coupled Device (CCD) image sensor.

The imaging device 100 may be a vehicle camera, a vehicle monitor, or the like.

The imaging device 100 provided in this embodiment includes the vehicle lens 10. Since the vehicle lens 10 uses a combination of glass spherical surfaces and glass aspherical surfaces, various aberrations of an imaging system are better corrected, so the imaging device 100 provided by this embodiment has characteristics such as high resolution and good imaging effect.

Embodiment 8

Figure 26:
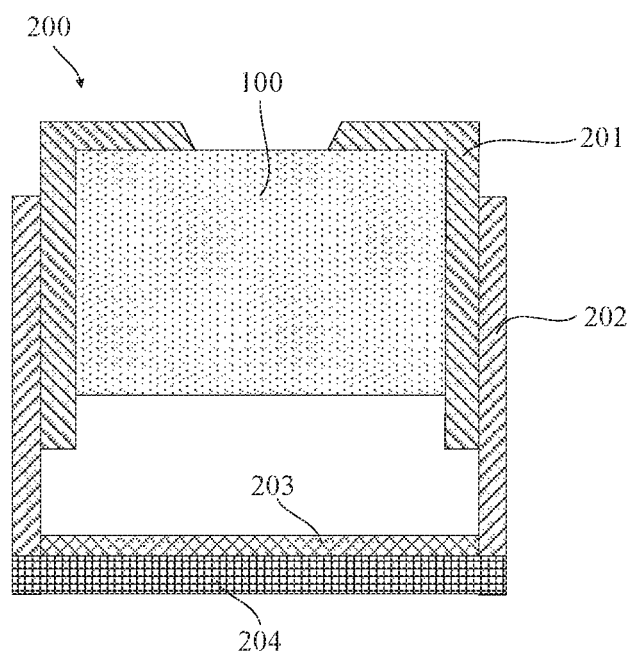
FIG. 26 is a schematic structural diagram showing a cross-section of a camera module according to an eighth embodiment of the disclosure.

FIG. 26 illustrates a camera module 200, which includes the vehicle lens 10 of any embodiment as described above, a barrel 201, a holder 202, an image sensor 203, and a printed circuit board 204. The wide-angle lens 100 is received in the barrel 201, and the barrel 201 is engaged with the holder 202. The image sensor 203 and the printed circuit board 204 are substantially accommodated in the holder 202. The image sensor 203 is opposite to the vehicle lens 10 and is mounted on the printed circuit board 204. The image sensor 203 is configured for converting light signals into electrical signals, thereby the images formed by the vehicle lens 10 can be converted and transmitted to a processor. The printed circuit board 204 can be further electrically connected to a chip or the processor via a flexible circuit board.

Embodiment 9

Figure 27:
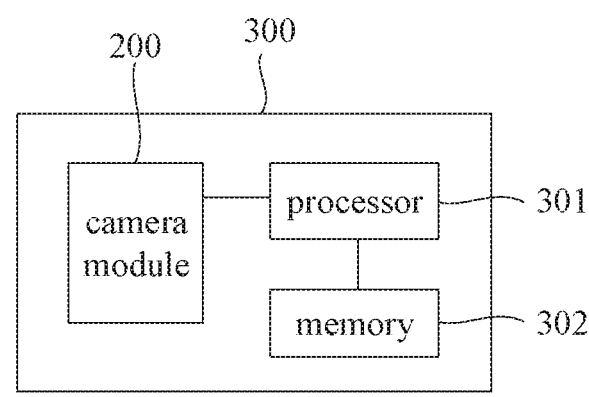
FIG. 27 is a schematic block diagram of a vehicle camera according to a ninth embodiment of the disclosure.
Figure 28:
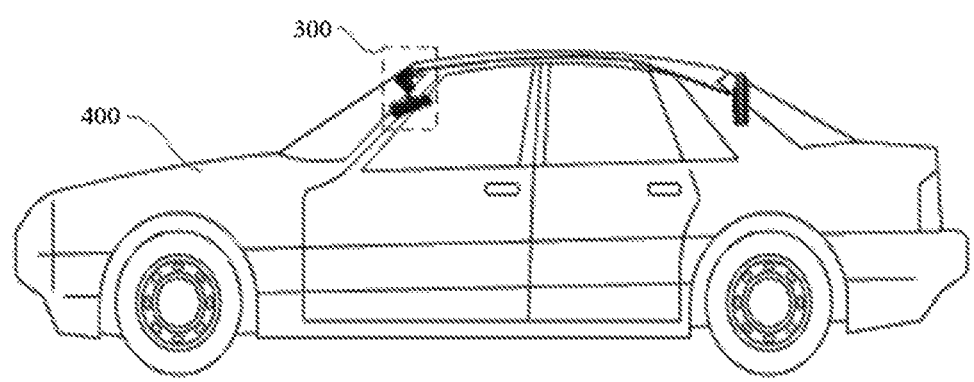
FIG. 28 is a schematic diagram of the vehicle camera according to the ninth embodiment of the disclosure.

FIGS. 27 and 28 illustrates a vehicle camera 300 mounted on a car 400, the vehicle camera 300 includes the camera module 200 as described above, a processor 301, and a memory 302. The camera module 200 is configured to capture images, the processor 301 is configured to process the captured images, and the memory 302 is configured to store the captured images. The processor 301 is communicated with the camera module 200 and the memory 302. That is, the electrical signals of the images can be transmitted to the processor 301 and stored in the memory 302. The vehicle camera 300 can be applied to an automatic driving system. The vehicle camera 300 can be applied to a driverless vehicle system of the car 400, so that the driverless vehicle system can control the direction or the speed of the car 400 according to the captured images of the surroundings.

The above embodiments just express several implementation manners of the disclosure, and the descriptions thereof are relatively specific and detailed, but cannot be understood as limiting the scope of the disclosure. It should be noted that, for those of ordinary skill in the art, without departing from the concept of the disclosure, modifications and improvements can be made, and these all belong to the scope of the disclosure. Therefore, the scope of the disclosure should be subject to the appended claims.

What is claimed is:

1. A vehicle lens, from an object side to an image side thereof, sequentially comprising:
   a first group with a negative refractive power, the first group comprising a first lens and a second lens from the object side to the image side, at least one of the first lens and the second lens is an aspheric lens;
   a stop;
   a second group with a positive refractive power, the second group at least comprising a third lens; and
   a third group with a positive refractive power, the third group comprising a fourth lens, a fifth lens, and a sixth lens from the object side to the image side, wherein the fourth lens has a positive refractive power, an convex object side surface and an convex image side surface, the fifth lens has a negative refractive power and a concave object side surface, the sixth lens has a positive refractive power, at least one of the fourth lens, the fifth lens, and the sixth lens is an aspheric lens;
   wherein the vehicle lens meets the expressions:

$$2 < D_2/D_1 < 3;$$

$$110° < FOV < 140°;$$

$$0.8 < T_{Q2}/f < 3;$$

$$-7 \times 10^{-6}/°C. < (dn/dt)_{Q2} < 0;$$

where $D_1$ represents the optical aperture of the first lens corresponding to the central field of view of the vehicle lens, $D_2$ represents the optical aperture of the first lens corresponding to the maximum field of view of the vehicle lens, FOV represents the maximum field of view of the vehicle lens $T_{Q2}$ represents the sum of a center thickness of every lens of the second group, f represents a system focal length of the vehicle lens, and $(dn/dt)_{Q2}$ represents the sum of a temperature coefficient of refractive index of every lens of the second group.

2. The vehicle lens as claimed in claim 1, wherein the first lens has a negative refractive power, a convex object side surface and a concave image side surface, the first lens is an aspheric lens, and an object side surface of the second lens is a concave surface.

3. The vehicle lens as claimed in claim 1, wherein the third lens has a positive refractive power, an object side surface and an image side surface of the third lens are both convex surfaces, and the third lens is an aspheric lens.

4. The vehicle lens as claimed in claim 1, wherein the second group further includes a seventh lens positioned between the third lens and the third group, the seventh lens has a positive refractive power, an object side surface and an image side surface of the seventh lens are both convex surfaces, the third lens has a positive refractive power, an object side surface and an image side surface of the third lens are both convex surfaces.

5. The vehicle lens as claimed in claim 1, wherein the fourth lens and the fifth lens are cemented to form a cemented body, an object side surface of the sixth lens is a convex surface, and the sixth lens is an aspheric lens.

6. The vehicle lens as claimed in claim 1, wherein the vehicle lens meets the expressions:

$-3 < f_{Q1}/f < 0$;

$1 < f_{Q2}/f < 4$;

where $f_{Q1}$ presents the combined focal length of the first group, $f_{Q2}$ represents the combined focal length of the second group.

7. The vehicle lens as claimed in claim 1, wherein the vehicle lens meets the expressions:

$-0.35 < (IH_\theta - f*\theta)/(f*\theta) < -0.2$;

$0.93 < \theta < 1.18$;

where $\theta$ represents the half of the maximum FOV of the vehicle lens, the unit of $\theta$ is radian, $IH_\theta$ represents the actual image height corresponding to the half of the maximum FOV of the vehicle lens $\theta$, vehicle lens.

8. The vehicle lens as claimed in claim 1, wherein the vehicle lens meets the expressions:

$1 < R_{11}/f < 3$;

$-4 < R_{21}/f < -0.8$;

$0.05 < T_{11}/f < 0.25$;

where $R_{11}$ represents a radius of curvature of a center of an object side surface of the first lens, $R_{21}$ represents a radius of curvature of a center of an object side surface of the second lens, and $T_{11}$ represents a vector height of the vertex of an object side surface of the first lens.

9. The vehicle lens as claimed in claim 1, wherein the vehicle lens meets the expression:

$1.2 < TTL \cdot f / IH_\theta < 1.8$;

where TTL represents the system optical total length, and f represents the system focal length of the vehicle lens, $\theta$ represents the half of the maximum FOV of the vehicle lens, $IH_\theta$ represents the actual image height corresponding to the half of the maximum FOV of the vehicle lens $\theta$.

10. The vehicle lens as claimed in claim 1, wherein each of the first lens to the sixth lens of the vehicle lens is a glass lens.

11. The vehicle lens as claimed in claim 1, wherein the F number of the vehicle lens is less than or equal to 1.5.

12. A camera module, comprising a vehicle lens and an image sensor opposite to the vehicle lens, wherein, from an object side to an image side, the vehicle lens sequentially comprises:
a first group with a negative refractive power, the first group comprising a first lens and a second lens, at least one of the first lens and the second lens is an aspheric lens;
a stop;
a second group with a positive refractive power, the second group comprising a bi-convex third lens; and
a third group with a positive refractive power, the third group comprising a bi-convex fourth lens, a fifth lens, and a sixth lens, wherein the fourth lens has a positive refractive power, the fifth lens has a negative refractive power, the sixth lens has a positive refractive power, at least one of the fourth lens, the fifth lens, and the sixth lens is an aspheric lens
wherein the vehicle lens meets the expressions:

$-3 < f_{Q1}/f < 0$;

$110° < FOV < 140°$;

$0.8 < T_{Q2}/f < 3$;

$-7 \times 10^{-6}/°C. < (dn/dt)_{Q2} < 0$;

where $f_{Q1}$ represents the combined focal length of the first group, $f_{Q2}$ represents the combined focal length of the second group, f represents the system focal length of the vehicle lens, $T_{Q2}$ represents the sum of a center thickness of every lens of the second group, and $(dn/dt)_{Q2}$ represents the sum of a temperature coefficient of refractive index of every lens of the second group.

13. The camera module as claimed in claim 12, wherein the first lens has a negative refractive power, an object side surface of the first lens is convex, an image side surface of the first lens is concave, an object side surface of the second lens is concave, the third lens has a positive refractive power, the fourth lens and the fifth lens are cemented to form a cemented body, an object side surface of the sixth lens is convex, and first lens, the third lens and the sixth lens each are aspheric lenses.

14. The camera module as claimed in claim 13, wherein the second group further includes a bi-convex seventh lens positioned between the third lens and the third group, the seventh lens has a positive refractive power.

15. The camera module as claimed in claim 12, wherein the vehicle lens meets the expressions:

$2 < D_2/D_1 < 3$;

$110° < FOV < 140°$;

$1 < R_{11}/f < 3$;

$-4<R_{21}/f<-0.8;$ $0.05<T_{11}/f<0.25;$ where $D_1$ represents the optical aperture of the first lens corresponding to the central field of view of the vehicle lens, $D_2$ represents the optical aperture of the first lens corresponding to the maximum field of view of the vehicle lens, FOV represents the maximum field of view of the vehicle lens, $R_{11}$ represents a radius of curvature of a center of an object side surface of the first lens, $R_{21}$ represents a radius of curvature of a center of an object side surface of the second lens, $T_{11}$ represents a vector height of the vertex of an object side surface of the first lens.

16. The camera module as claimed in claim 12, wherein the vehicle lens meets the expressions:

$-0.35<(IH_\theta-f*\theta)/(f*\theta)<-0.2;$ $0.93<\theta<1.18;$ where $\theta$ represents the half of the maximum FOV of the vehicle lens, the unit of $\theta$ is radian, $^1H_\theta$ represents the actual image height corresponding to the $\theta$.

17. The camera module as claimed in claim 12, wherein the vehicle lens meets the expression:

$1.2<TTL/f/IH_\theta<1.8;$ where TTL represents the system optical total length, $\theta$ represents the half of the maximum FOV of the vehicle lens, $^1H_\theta$ represents the actual image height corresponding to the $\theta$.

18. A vehicle camera, comprising a camera module, a processor, and a memory, wherein the camera module is configured to capture one or more images, the processor is configured to process the captured images, and the memory is configured to store the images; the camera module comprises a camera lens and an image sensor opposite to the camera lens, from an object side to an imaging surface of the camera lens, the camera lens sequentially comprises:

a first group with a negative refractive power, the first group comprising a first lens and a second lens, at least one of the first lens and the second lens is an aspheric lens;

a stop;

a second group with a positive refractive power, the second group comprising a third lens and a seventh lens, at least one of the third lens and the seventh lens is an aspheric lens; and a third group with a positive refractive power, the third group comprising a fourth lens, a fifth lens, and a sixth lens, wherein the fourth lens has a positive refractive power, a convex object side surface and a convex image side surface, the fifth lens has a negative refractive power and a concave object side surface, the sixth lens has a positive refractive power, at least one of the fourth lens, the fifth lens, and the sixth lens is an aspheric lens;

wherein the vehicle lens meets the expressions:

$-0.35<(IH_\theta-f*\theta)/(f*\theta)<-0.2;$ $0.93<\theta<1.18;$ $0.8<T_{Q2}/f<3;$ $-7\times10^{-6}/°\text{ C.}<(dn/dt)_{Q2}<0;$ where $\theta$ represents the half of the maximum FOV of the vehicle lens, the unit of $\theta$ is radian, $^1H_\theta$ represents the actual image height corresponding to the half of the maximum FOV of the vehicle lens $\theta$, f represents the system focal length of the vehicle lens, $T_{Q2}$ represents the sum of a center thickness of every lens of the second group, and $(dn/dt)_{Q2}$ represents the sum of a temperature coefficient of refractive index of every lens of the second group.

19. The vehicle camera module as claimed in claim 18, wherein the first lens has a negative refractive power, an object side surface of the first lens is convex, an image side surface of the first lens is concave, an object side surface of the second lens is concave, the third lens has a positive refractive power, the fourth lens and the fifth lens are cemented to form a cemented body, an object side surface of the sixth lens is convex, and first lens, the third lens and the sixth lens each are aspheric lenses.

* * * * *